US008976292B2

(12) United States Patent
Siddaramanna et al.

(10) Patent No.: US 8,976,292 B2
(45) Date of Patent: Mar. 10, 2015

(54) PERCEPTUAL VIDEO QUALITY IMPROVEMENT FOR VIDEOS CONTAINING BLACK BARS

(71) Applicant: Texas Instruments Incorporated, Dallas, TX (US)

(72) Inventors: Mahant Siddaramanna, Bangalore (IN); Naveen Srinivasamurthy, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/689,175

(22) Filed: Nov. 29, 2012

(65) Prior Publication Data
US 2013/0155320 A1 Jun. 20, 2013

(51) Int. Cl.
*H04N 7/01* (2006.01)
*H04N 11/20* (2006.01)
*H04N 5/46* (2006.01)
*H04N 21/4402* (2011.01)

(52) U.S. Cl.
CPC .............. *H04N 7/0122* (2013.01); *H04N 5/46* (2013.01); *H04N 21/440272* (2013.01)
USPC ............ 348/445; 348/556; 348/558; 348/441

(58) Field of Classification Search
CPC .................... H04N 7/0122; H04N 21/440272; H04N 5/46
See application file for complete search history.

(56) References Cited

U.S. PATENT DOCUMENTS 8,098,328 B2 * 1/2012 Fujisawa et al. .............. 348/558
2004/0114049 A1 * 6/2004 Arora ........................... 348/445

* cited by examiner

*Primary Examiner* — Jefferey Harold
*Assistant Examiner* — Omer Khalid
(74) *Attorney, Agent, or Firm* — Robert D. Marshall, Jr.; Frederick J. Telecky, Jr.

(57) ABSTRACT

A method of improving the perceptual video quality of video sequences containing black bars. Horizontal or vertical black bars caused by a missmatch between the aspect ratio of the encoded video and the display device. The presence of black bars is detected, and the encoding process is adjusted to eliminate visual depredation of the reproduced video.

12 Claims, 6 Drawing Sheets

ORIGINAL IMAGE

IMAGE WITH BLACK BAR DETECTION

PERCEPTUAL VIDEO QUALITY IMPROVEMENT FOR VIDEOS CONTAINING BLACK BARS

CLAIM OF PRIORITY

This application claims priority under 35 U.S.C. 119(e)(1) to Indian Provisional Application No. 4307/CHE/2011 filed 9 Dec. 2011.

TECHNICAL FIELD OF THE INVENTION

The technical field of this invention is digital video processing.

BACKGROUND OF THE INVENTION

Black bars are black strips that show up either at the top and bottom or at left and right of a video. To understand the reason for presence of black bars we need to know about video aspect ratio. "Aspect Ratio" is ratio of width of the video to height of the video.

There are two common TV screen sizes:
  Conventional TV—aspect ratio 4:3
  Widescreen TV—aspect ratio 16:9

Figure 3:
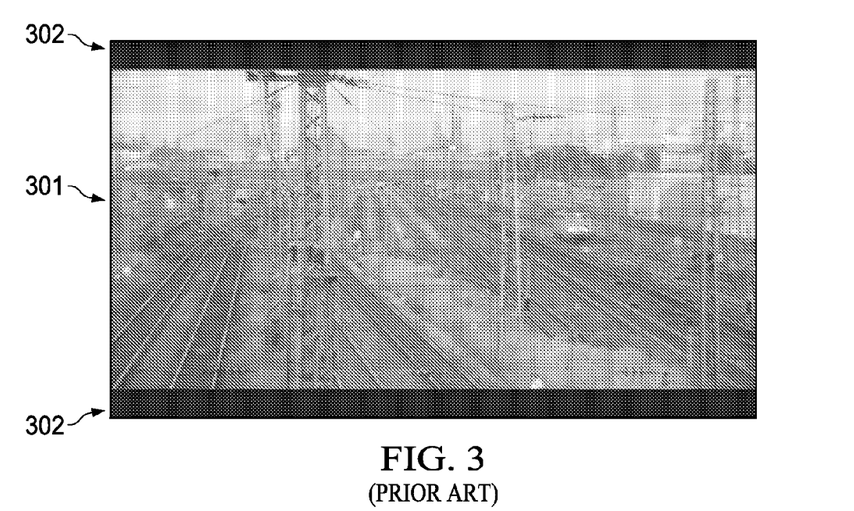
FIG. 3 shows a display with horizontal black bars.

Video contents typically have either a 4:3 or 16:9 ratios. When the aspect ratios of the TV and video content are different, the results will be black bars. Depending on combination of above two ratios, there are two different types of black bars:
  Horizontal black bars
  Vertical black bars Viewing of a 16:9 video content on a 4:3 TV creates horizontal black bars. Video sequences of 16:9 resolutions are up scaled to 16:12 by inserting a black bar on the top and at the bottom of video frames. Then the up scaled 16:12 version is now suitable for viewing on 4:3 TV. This is shown in FIG. 3 where 301 is the main picture, and 302 is the black bar.

Viewing of a 4:3 video content on a 16:9 TV generates vertical black bars.

Figure 4:
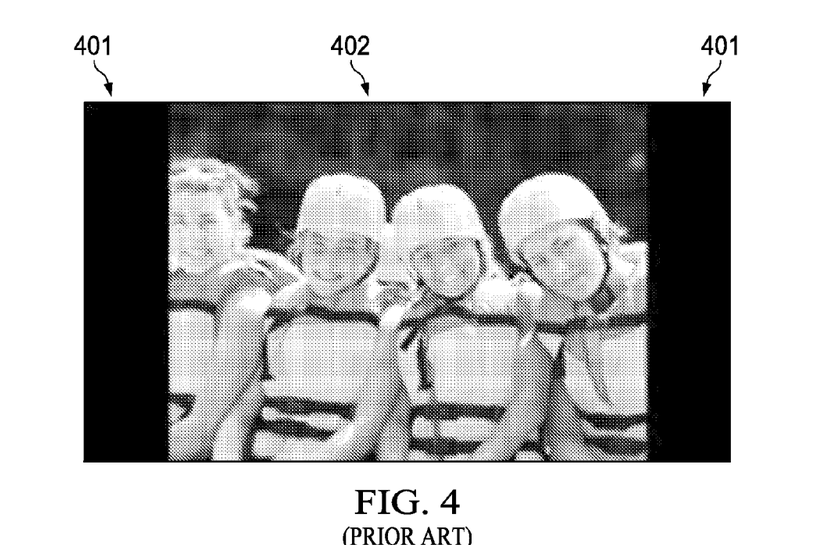
FIG. 4 shows a display with vertical black bars.

Video of 4:3 resolutions corresponds to 12:9. This 12:9 video is converted into 16:9 by inserting a black bar on the left and at the right side of video frames, thus enabling the video to be viewed on a 16:9 TV. This is shown in FIG. 4 where 402 is the main picture, and 401 is the black bar.

Note that whenever video content and TV aspect ratio are matched there will be no black bars.

SUMMARY OF THE INVENTION

This invention addresses the problem of improving perceptual video quality in video sequences containing black bars. "Black bars" are black strips that show up either at the top and bottom or at left and right of a video, and are caused by a mismatch of the aspect ratio between the original encoded video sequence, and the display device. Typically, the issue of how to handle black bars has been addressed by detecting and removing it before display. However, detection of black bars and using this information during encoding has not been attempted. This invention will detect black bars and when they occur, and the encoder operation is modified to resolve the issue by:
  Using 4 Mv/MB or 16 Mv/MB for partial black bars
  Forcing all full black bar MBs to be skip MBs
  Ensuring that row level rate control does not react to full black bar rows

BRIEF DESCRIPTION OF THE DRAWINGS

These and other aspects of this invention are illustrated in the drawings, in which.

DETAILED DESCRIPTION OF PREFERRED EMBODIMENTS

Figure 1:
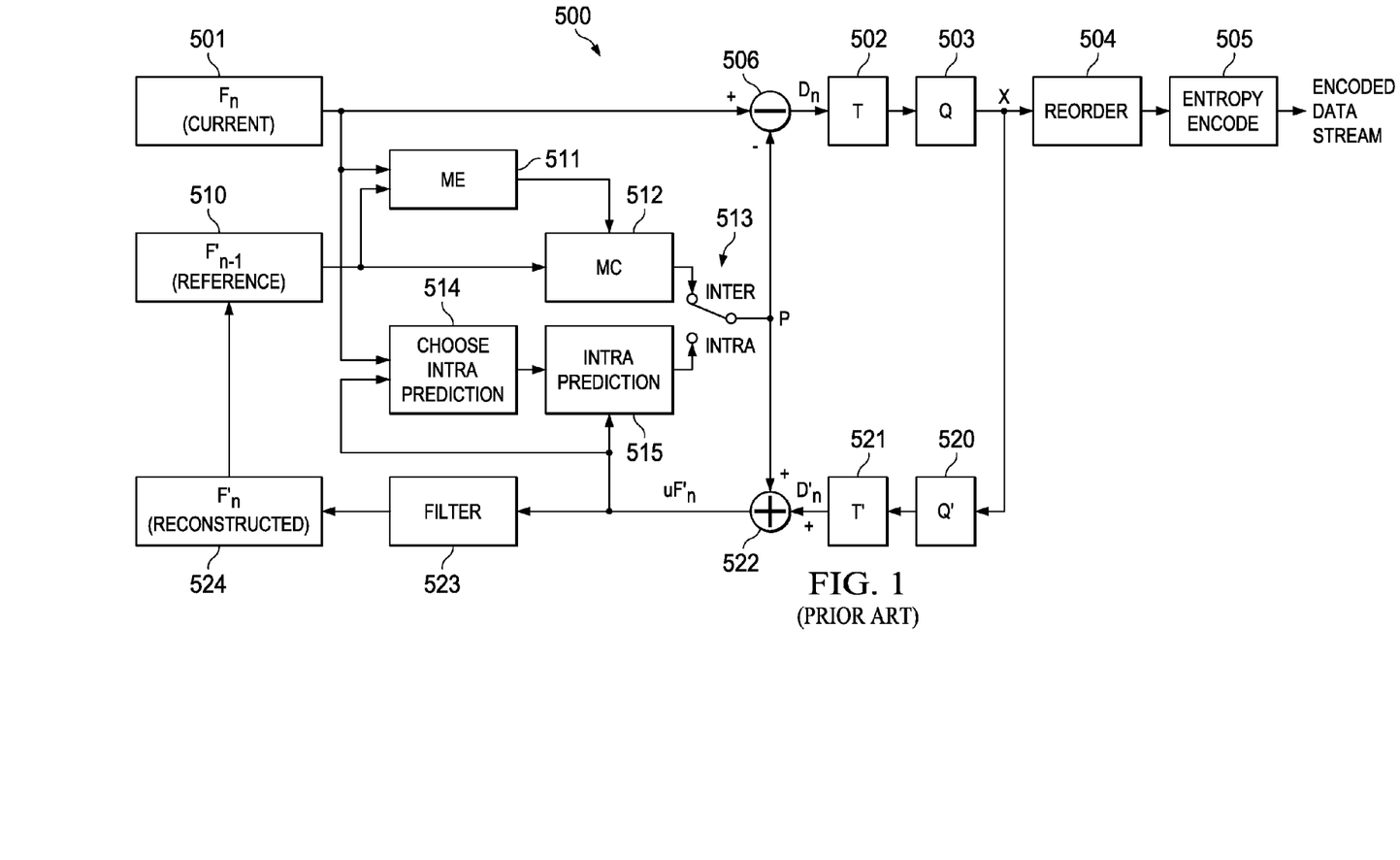
FIG. 1 illustrates an overview of the video encoding process of the prior art.

FIG. 1 illustrates the encoding process 500 of video encoding according to the prior art. Many video encoding standards use similar processes such as represented in FIG. 1. Encoding process 500 begins with the n th (current) frame $F_n$ 501. Frequency transform block 502 transforms a macroblock of the pixel data into the spatial frequency domain. This typically involves a discrete cosine transform (DCT). This frequency domain data is quantized in quantization block 503. This quantization typically takes into account the range of data values for the current macroblock. Thus differing macroblocks may have differing quantizations. In accordance with the H.264 standard, in the base profile the macroblock data may be arbitrarily reordered via reorder block 504. As will be explained below, this reordering is reversed upon decoding. Other video encoding standards and the H.264 main profile transmit data for the macroblocks in strict raster scan order. The quantized data is encoded by entropy encoding block 505. Entropy encoding employs fewer bits to encode more frequently used symbols and more bits to encode less frequency used symbols. This process reduces the amount of encoded that must be transmitted and/or stored. The resulting entropy encoded data is the encoded data stream.

Video encoding standards typically permit two types of predictions. In inter-frame prediction, data is compared with data from the corresponding location of another frame. In intra-frame prediction, data is compared with data from another location in the same frame.

For inter prediction, data from n−1th (previous) frame $F_{n-1}$ 510 and data from the nth frame $F_n$ 501 supply motion estimation block 511. Motion estimation block 511 determines the positions and motion vectors of moving objects within the picture. This motion data is supplied to motion compensation block 512 along with data from n−1th frame $F_{n-1}$ 510. The resulting motion compensated frame data is selected by switch 513 for application to subtraction unit 506. Subtraction unit 506 subtracts the inter prediction data from switch 513 from the input frame data from nth frame $F_n$ 501. Thus frequency transform block 502, quantization block 503, reorder block 504 and entropy encoding block 505 encode the differential data rather than the original frame data. Assuming there is relatively little change from frame to frame, this differential data has a smaller magnitude than the raw frame data. Thus this can be expressed in fewer bits contributing to data compression. This is true even if motion estimation block 511 and motion compensation block 512 find no moving objects to code. If the nth frame $F_n$ and the n−1th frame $F_{n-1}$ are identical, the subtraction unit 506 will produce a string of zeros for data. This data string can be encoded using few bits.

The second type of prediction is intra prediction. Intra prediction predicts a macroblock of the current frame from another macroblock of the current frame. Inverse quantization block 520 receives the quantized data from quantization block 503 and substantially recovers the original frequency domain data. Inverse frequency transform block 521 transforms the frequency domain data from inverse quantization block 520 back to the spatial domain. This spatial domain data supplies one input of addition unit 522, whose function will be further described. Encoding process 500 includes choose intra predication unit 514 to determine whether to implement intra prediction. Choose intra prediction unit 514 receives data from nth frame $F_n$ 501 and the output of addition unit 522. Choose intra prediction unit 514 signals intra prediction unit 515, which also receives the output of addition unit 522. Switch 513 selects the intra prediction output for application to the subtraction input of subtraction units 506 and an addition input of addition unit 522. Intra prediction is based upon the recovered data from inverse quantization block 520 and inverse frequency transform block 521 in order to better match the processing at decoding. If the encoding used the original frame, there might be drift between these processes resulting in growing errors.

Video encoders typically periodically transmit unpredicted frames. In such an event the predicted frame is all 0's. Subtraction unit 506 thus produces data corresponding to the nth frame $F_n$ 501 data. Periodic unpredicted or I frames limits any drift between the transmitter coding and the receive decoding. In a video movie a scene change may produce such a large change between adjacent frames that differential coding provides little advantage. Video coding standards typically signal whether a frame is a predicted frame and the type of prediction in the transmitted data stream.

Encoding process 500 includes reconstruction of the frame based upon this recovered data. The output of addition unit 522 supplies deblock filter 523. Deblock filter 523 smoothes artifacts created by the block and macroblock nature of the encoding process. The result is reconstructed frame $F'_n$ 524. As shown schematically in FIG. 1, this reconstructed frame $F'_n$ 524 becomes the next reference frame $F_{n-1}$ 510.

Figure 2:
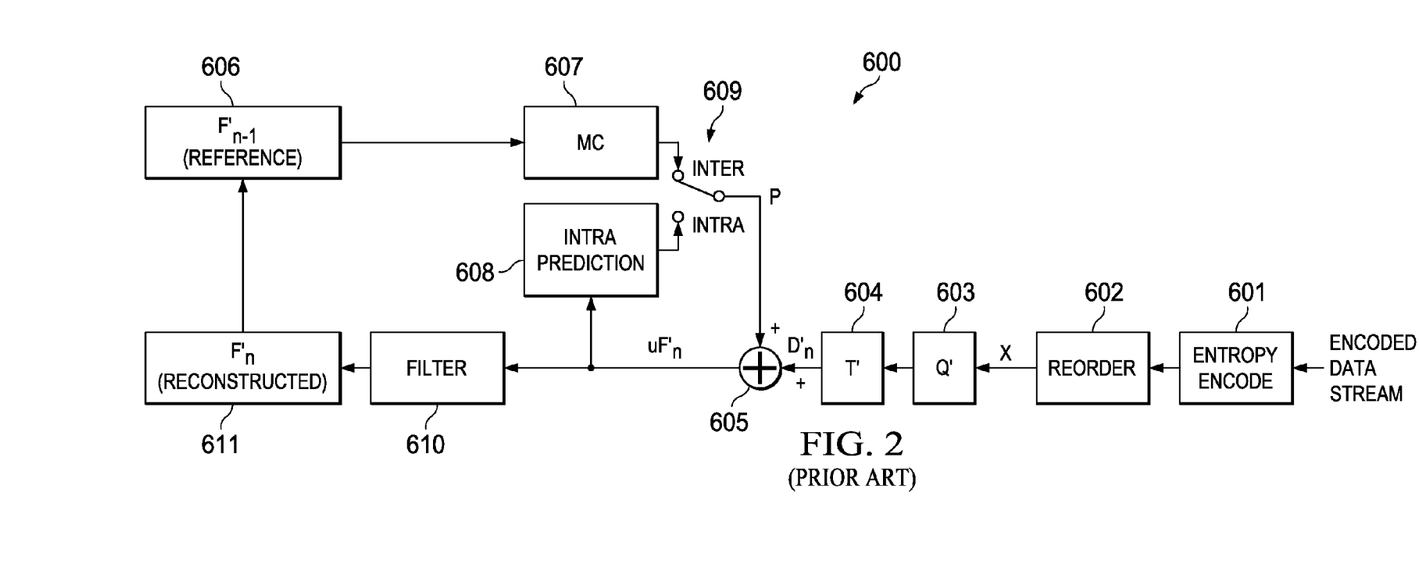
FIG. 2 illustrates an overview of the video decoding process of the prior art.

FIG. 2 illustrates the corresponding decoding process 600. Entropy decode unit 601 receives the encoded data stream. Entropy decode unit 601 recovers the symbols from the entropy encoding of entropy encoding unit 505. Reorder unit 602 assembles the macroblocks in raster scan order reversing the reordering of reorder unit 504.

Inverse quantization block 603 receives the quantized data from reorder unit 602 and substantially recovers the original frequency domain data. Inverse frequency transform block 604 transforms the frequency domain data from inverse quantization block 603 back to the spatial domain. This spatial domain data supplies one input of addition unit 605. The other input of addition input 605 comes from switch 609. In inter prediction mode switch 609 selects the output of motion compensation unit 607. Motion compensation unit 607 receives the reference frame $F'_{n-1}$ 606 and applies the motion compensation computed by motion compensation unit 512 and transmitted in the encoded data stream.

Switch 609 may also select an intra prediction mode. The intra prediction is signaled in the encoded data stream. If this is selected, intra prediction unit 608 forms the predicted data from the output of adder 605 and then applies the intra prediction computed by intra prediction block 515 of the encoding process 500. Addition unit 605 recovers the predicted frame. As previously discussed in conjunction with encoding, it is possible to transmit an unpredicted or I frame. If the data stream signals that a received frame is an I frame, then the predicted frame supplied to addition unit 605 is all 0's.

The output of addition unit 605 supplies the input of deblock filter 610. Deblock filter 610 smoothes artifacts created by the block and macroblock nature of the encoding process. The result is reconstructed frame $F'_n$ 611. As shown schematically in FIG. 2, this reconstructed frame $F'_n$ 611 becomes the next reference frame $F_{n-1}$ 606.

The deblocking filtering of deblock filter 523 and deblock 610 must be the same. This enables the decoding process to accurately reflect the input frame $F_n$ 501 without error drift. The H.264 standard has a specific, very detailed decision matrix and corresponding filter operations for this process. The standard deblock filtering is applied to every macroblock in raster scan order. This deblock filtering smoothes artifacts created by the block and macroblock nature of the encoding. The filtered macroblock is used as the reference frame in predicted frames in both encoding and decoding. The encoding and decoding apply the identical processing the reconstructed frame to reduce the residual error after prediction.

This invention addresses the problem of improving perceptual video quality in video sequences containing black bars.

A number of problems arise when a video containing a black bar is encoded.

1. Boundaries of the black bars do not coincide with macroblock boundaries.

Black bars as we know are inserted to get the desired aspect ratios. This does not guarantee that black bar ends exactly at macroblock endings and this is true for most of the cases. This results in boundary of the black bar to lie within macroblocks. For such macroblocks motion estimation typically does not work well and usually results in very annoying artifacts for the boundary macroblocks. This problem is further increased for High Efficiency Video Codecs (HEVC) since the HEVC prediction unit (PU) sizes can be 64×64, 32×32, 16×16, 8×8 or 4×4.

2. At high QP (Quantization Parameter), black bar regions sometimes get encoded as Intra or Inter macroblocks.

Ideally all the macroblocks completely within a black bar should be coded as skip macroblocks. But sometimes it is observed that macroblocks inside the black bar gets coded as Intra or Inter macroblocks.

3. Issue with row level QP modulation

Rate control works so as to achieve target bitrate set by the user. For this it is important to meet the desired number of bits per frame. Row level rate control helps in achieving this purpose by changing QP at row levels.

But in case of black bars this has serious side effect. The number of bits consumed in black bar area is typically very low compared to encoding of normal data. As the number of bits consumed will be less for black bar rows, row level rate control decreases the QP drastically before encoding row with actual video data. Thereby bits consumed for the actual video data row (the row after the black bar) will increase enormously. Rate control then starts penalizing the subsequent rows with higher QPs.

This will result in the top part of frame being coded with higher quality relative to the bottom half leading to non-uniform video quality within a frame. Significant video quality variation within the video frame is undesirable from perceptual video quality perspective. Hence, the perceptually video quality will be degraded.

4. Pulsating artifacts within black bar region at low bitrates.

At low bitrates annoying pulsating problems occur due to use of high QP within the black bar region. This pulsating effect is caused by the following:

The black bar is not uniform for entire black bar region. Analog noise or noise introduced during the A to D conversion causes intra/inter MBs to be encoded in black bars areas. Also chroma artifacts are sometimes observed within the black bar region. This pulsating problem issue can be resolved if the encoder is aware of which macroblocks belong to black bar area.

As discussed previously encoding of videos with black bars has several side effects. The most appropriate solution is to detect videos with black bars and handle them specially.

In the described invention we make use of a pre-processing engine, however a general purpose processor can also be used for detecting black bars.

The pre-processing engine starts by sub-sampling the frames into windows and further sub-sampling each window into 2×2 blocks. For each of the sub-sampled 2×2 blocks every pixel is accumulated. Each pixel is compared to a limit set in a register. If any of the pixels in the 2×2 block are greater than or equal to the limit then the block is not counted in the unsaturated block counter. Note that the pre-processing engine or the general purpose processor may operate in the RGB or YUV color space.

The sub-sampling of frame into windows is handled by sub-sampler module. The saturation check module deals with maintaining of unsaturated block counts.

The sub-sampler module takes as input the starting position of the windows set by WINSH for the horizontal start and by WINSV for the vertical starting point. The height of the window is set by WINH and the width by WINW. The number of windows in a horizontal direction is set by WINHC while WINVC sets the number of windows in the vertical dimension.

Figure 5:
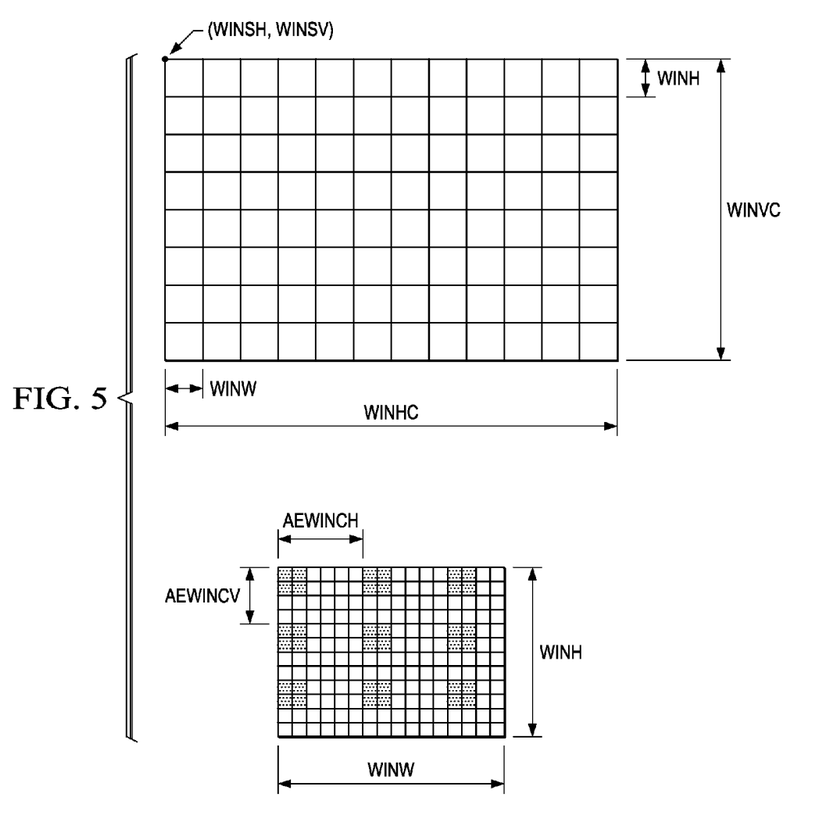
FIG. 5 illustrates the sub-sampler window settings.

Each window is further sampled down to a set of 2×2 blocks. The horizontal distance between the start of blocks is set by AEWINCH. The vertical distance between the start of blocks is set by AEWINCV. This is shown in FIG. 5.

The saturation check module takes the data from the sub-sampler and compares it to the value in the limit register. It replaces the value of a pixel that is greater than the value in the limit register with the value in the limit register. If all four pixels in the 2×2 block are below the limit, then the value of the unsaturated block counter is incremented. There is one unsaturated block counter per window.

Black bars can be horizontal, vertical or a mix of the two. The logic of black bar detection can be applied to any type of black bars. For the sake of simplicity in explanation, initially we consider only horizontal black bars and later we address vertical black bar detection.

For horizontal black bar detection we take the advantage of raster scan order of video encoding and also the pattern of black bars in videos.

A fixed numbers of top and bottom rows of the frame are divided into windows.

Figure 6:
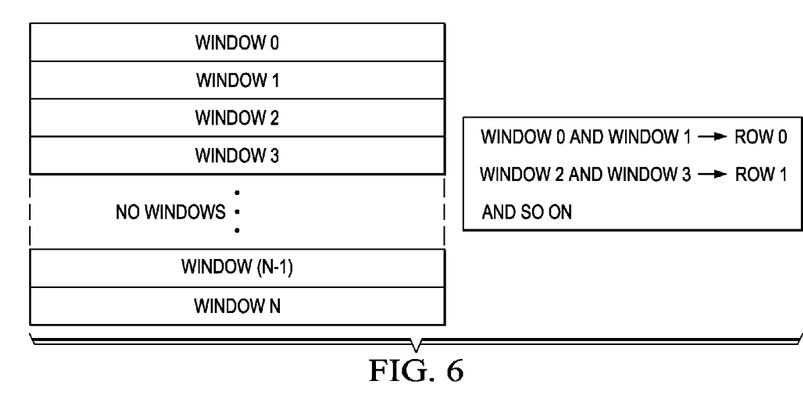
FIG. 6 illustrates a frame sub-sampled into a window.

Each row is divided into two windows. Thereby the window dimensions will be (8) pixels×(Frame Width) pixels. FIG. 6 shows how frame is sub divided into windows.

The reason for setting only fixed number of top and bottom rows as windows is because horizontal black bars are expected only in the top and bottom part of videos. So it makes no sense to insert windows in middle portion of videos where probability of finding a "true" black bar is zero.

Also, the sub-sampler module supports a maximum of 128 windows in vertical direction. For higher resolutions this will be a limiting factor if we insert windows through out the frame. This should not be a constraint in case of general purpose processor but inserting windows throughout the frame causes increased cycle consumption.

Further within the window we insert 2×2 sub blocks as shown below in FIG. 7.

Each window consists of 8 pixels×Frame width pixels. Consider that the window is further divided as 8×16 blocks called MBx. So now the window is nothing but concatenation of series of MBxs. The total number of MBx will be same as total number of macroblocks in the row.

Figure 7:
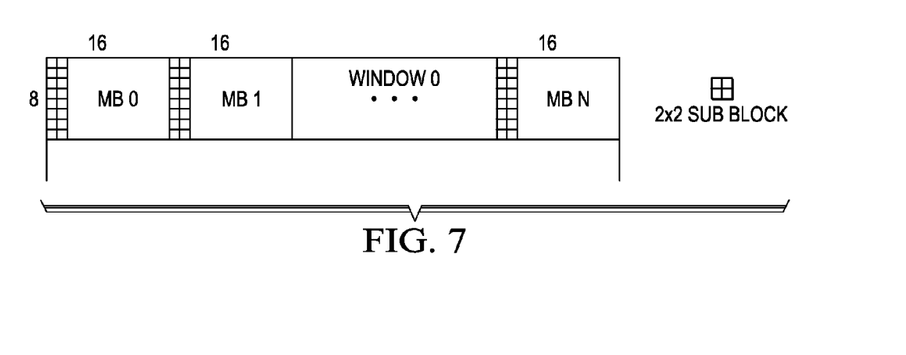
FIG. 7 illustrates a window sub-sampled into 2×2 sub-blocks.

Within each MBx (8×16 pixels) we set registers of the pre-processor get four 2×2 sub blocks as shown in FIG. 7. For a black pixel, value of (r,g,b) will be low (~10). We set the value in the limit register to very a low value (~20). There is one unsaturated block counter maintained for every window. Once the module is executed, by checking the value in the unsaturated block counters we can confirm the presence of a complete black bar or a partial black bar in the pictures.

We classify the windows as "full black window", "partial black window" or "non black window". The conditions distinguishing the above types are as below:

Full black window: If unsaturated block count≈(4*number of macroblocks in row). This accounts for 100% of sub blocks (2×2) being accounted in unsaturated block count.

Partial black window: If unsaturated block count>(2.66 number of macroblocks in row). This accounts for 66% of sub blocks (2×2) being accounted in unsaturated block count. This is to handle the cases where black bar ends within a macroblock.

Else, non black window.

The above logic works well if there are actual black bars in videos. But if part of the video content is dark or the video is marked by changes in intensity the logic leads to spurious black bar detections.

The logic below helps to eliminate such spurious detections.

If a window is confirmed to be a non black window, than all windows below and above (depending on whether window is in top or bottom part of image) are made non black window.

If a window is confirmed to be a partial black window, than all windows below and above (depending on whether window is in top or bottom part of image) are made non black window.

If a window is confirmed to be a black window, than proceed to the next window.

At the end of these processes we have the mapping of windows to the type of black bar (full black bar, partial black bar, non black bar).

Vertical black bar detection follows the same logic as that of horizontal detection; except that the windows run vertically in this case.

Figure 8:
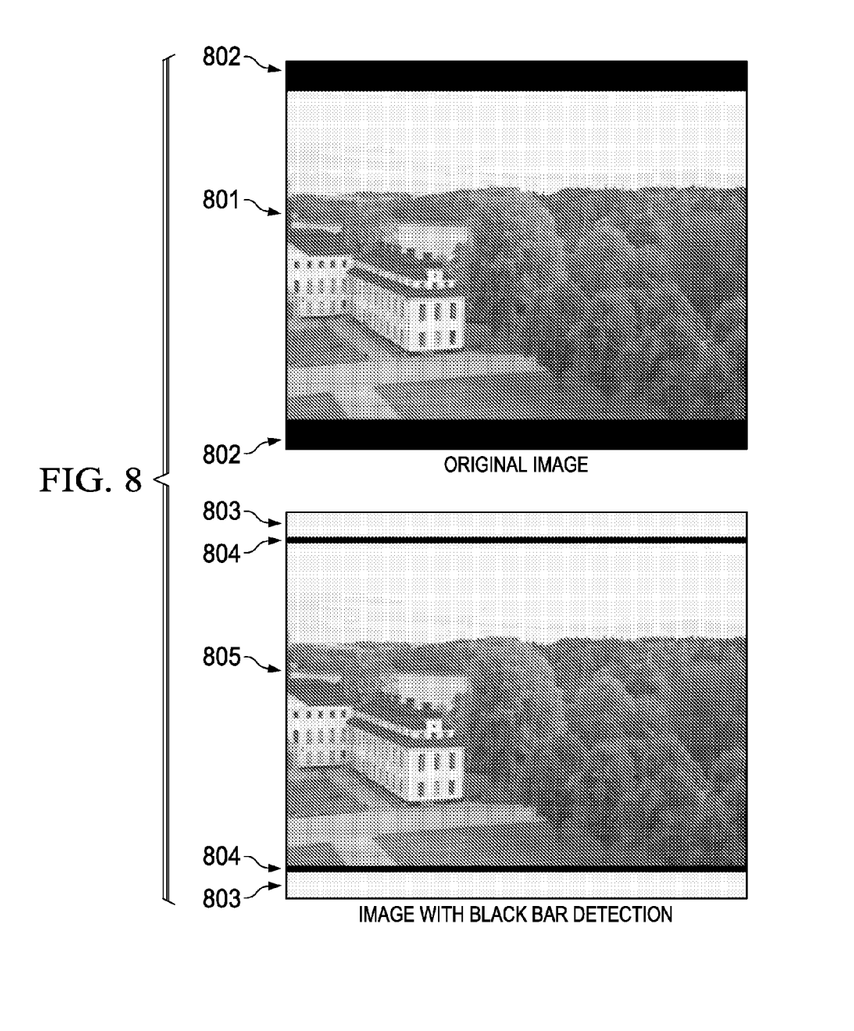
FIG. 8 illustrates the results of the black bar detection process.

FIG. 8 shows the results of the black bar detection method described in this invention. 801 is the original image with black bar 802 at the top and the bottom of the picture. 805 is the image after the black bar detection, where 803 is a full black bar and 804 is a partial black bar, with no black bars in 805. The images clearly shows the efficiency of the black bar detection. Both complete black bars and partial black bars are detected.

Each row consists of two windows. Depending on the type of two windows we classify rows as full, partial and non black bar row.

If both windows are full black windows then the row is a full black bar row.
    Else if one of the windows is a partial black window then it is a partial black row.
    Else it is not a black bar row.

To accommodate the situation where the boundaries of the black bars do not coincide with the macroblock boundaries, the following is done:

If either a full black bar row or non black bar row is identified, then use one motion vector per macroblock, i.e., 1 Mv/MB for the entire row.
    If a partial black bar row is confirmed, then turn on four or sixteen motion vector (MV) per macroblock (MB), 4 Mv/MB or 16 Mv/MB for the entire row. Note that 16×8 for 4 Mv/MB or 16×4/16×8/16×12 for 16 Mv/MB might be sufficient. 4 Mv/MB or 16 Mv/MB can be enabled for the entire frame. But using 4 Mv/MB or 16 Mv/MB for entire frame is much more cycle intensive compared to the proposed solution.

A number of macroblocks in the black bar region may get coded as Intra or Inter macroblocks which ideally should have been skip macroblocks. This usually results in increased bit consumption.

The solution to this problem is to force all the macro blocks in the full black bar region to be skip macroblocks. One thing that should be taken care along with above solution is to encode all the macroblocks in black bar of Intra picture with high fidelity.

This ensures better perceptual video quality and also reduces perceptual artifacts within the black bar.

Because of low bit consumption in black bar regions the row level rate control will reduce the QP for subsequent rows. This leads to encoding of actual video data at lower QP thereby increasing total bits consumed. Sequentially further rows are penalized with higher QP. The top part of the video has better quality when compared to the bottom part of the video. This results in irregular distribution of video quality within a frame.

The solution to this problem is to turn OFF row level rate control whenever a full black bar row is detected. Further for rate control treat actual data as if it was the first row to be encoded. This prevents unintended QP changes and ensures uniform video quality throughout the frame. This also helps in reducing the cycles required to compute row level QP leading to marginally better performance.

To demonstrate the video quality advantages of the invention, results with and without black bar encoding are provided. All the experiments were run on same test suite which contains twelve video streams with black bars. The results are provided for two different objective metrics: PSNR (Peak Signal to Noise Ratio) and DMOS (Difference Mean Opinion Score).

Figure 9:
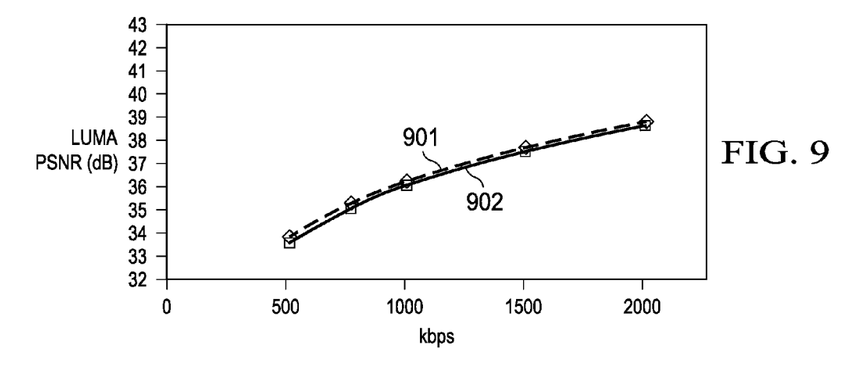
FIG. 9 is a PSNR plot with and without black bar processing.
Figure 10:
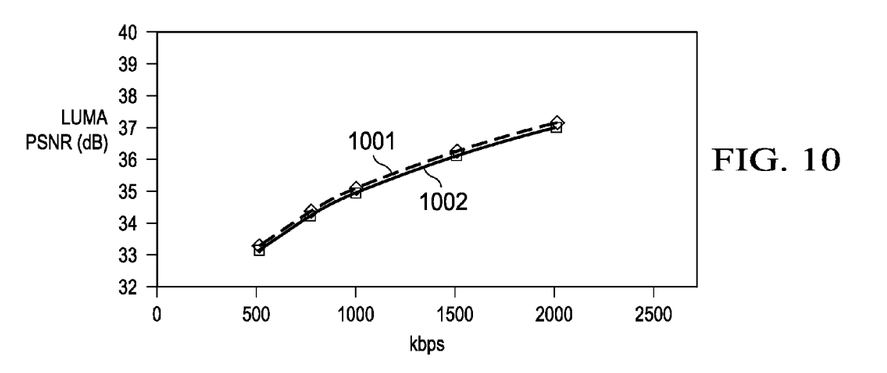
FIG. 10 is a PSNR plot with and without black bar processing.

The summary of PSNR values gains (when rate control is enabled) with black bar detection is provided below:
    Maximum Gain: 0.19 dB
    Average Gain: 0.08 dB The summary of PSNR values gains (when rate control is not enabled) with black bar detection is provided below:
    Maximum Gain: 0.25 dB
    Average Gain: 0.09 dB FIG. 9 shows the RD plot with black bar (901) and without black bar (902) for a D1 steam. It clearly indicates that RD performance with black bar detection is better than the one without it. FIG. 10 shows the RD plot for different D1 stream where again 1001 is with black bar and 1002 is without black bar.

The summary of DMOS values comparison with and without black bar encoding is shown below. DMOS scores are generally used to compare the perceptual quality of video.
    Maximum DMOS Gain: 2.13
    Average DMOS Gain: 0.38

Figure 11:
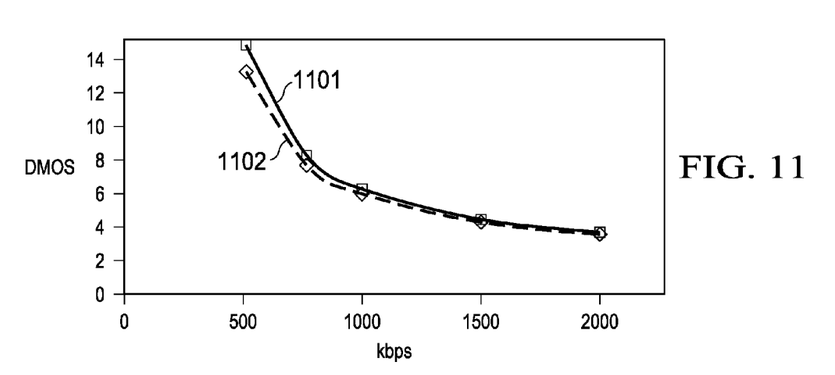
FIG. 11 is a DMOS plot with and without black bar processing.

In FIG. 11 DMOS scores with black bar (1101) and without black bar (1102) are plotted against bit rate (kbps) for a D1 stream. It again clearly indicates that DMOS scores with black bar detection are better than the one without it. Lower DMOS scores indicate better perceptive quality compared to higher values.

What is claimed is:

1. A method for encoding a video frame of data which may include black bars comprising the steps of:
    dividing a fixed number of top and bottom rows of the video frame of data into windows;
    dividing each row into two windows where the window size is defined as (8) pixels×(Frame Width) pixels;
    maintaining an unsaturated block counter corresponding to each window;
    dividing each window into a plurality of 8×16 pixel blocks MB0 through MBN (MBx) where the total number of pixel blocks MBx will be the same as the total number of macroblocks in the window;
    dividing each MBx into four 2×2 pixel sub blocks;
    comparing the value of each sub block within a window to a value pre stored in a limit register;
    incrementing the count in the unsaturated block counter for a corresponding window by one for each sub block within said window that has a value less than the value stored in the limit register;
    classifying each window as a full black window if the unsaturated block count≈(4*number of macroblocks in the row) accounting for 100% of the sub blocks;
    classifying each row as a full black row if both windows within the row are black windows;
    classifying each window as a partial black window if the unsaturated block count>(2.66*number of macroblocks in the row) accounting for 66% of the sub blocks;
    classifying each row as a partial black row if one of the windows within the row is a partial black window;
    classifying each window as a non black window if the unsaturated block count=<(2.66*number of macroblocks in the row);
    classifying each row as a non black row if both windows within the row are non black windows; and
    encoding each macroblock as a selected one of an Intra macro block, an Inter macroblock or a skip macroblock including encoding each macroblock within a full black row as a skip macroblock.

2. The method of claim 1 wherein:
    if a window in the top of the video frame is classified as a non black window then all windows below the non black window are classified as non black windows.

3. The method of claim 1 wherein:
    if a window in the bottom of the video frame is classified as a non black window then all windows above the non black window are classified as non black windows.

4. The method of claim 1 wherein:
    if a window in the top of the video frame is classified as a partial black window then all windows below the partial black window are classified as non black windows.

5. The method of claim 1 wherein:
if a window in the bottom of the video frame is classified as a partial black window then all windows above the partial black window are classified as non black windows.

6. The method of claim 1 wherein:
said windows are vertically aligned on the left and right side of the video frame.

7. The method of claim 6 wherein:
if a window in the left side of the video frame is classified as a non black window then all windows to the right of the non black window are classified as non black windows.

8. The method of claim 6 wherein:
if a window in the right side of the video frame is classified as a non black window then all windows to the left the non black window are classified as non black windows.

9. The method of claim 6 wherein:
if a window in the left side of the video frame is classified as a partial black window then all windows to the right of the partial black window are classified as non black windows.

10. The method of claim 6 wherein:
if a window in the right side of the video frame is classified as a partial black window then all windows to the left the partial black window are classified as non black windows.

11. The method of claim 1 wherein:
said step of encoding includes adjusting a quantization parameter used to encode a row of said video frame of data based upon a comparison of a number of bits used to encode a previous row relative to a desired number of bits to encode a video frame including not adjusting said quantization parameter if said previous row was a full black row.

12. The method of claim 1 wherein:
said step of adjusting a quantization parameter includes selecting an initial quantization parameter for a first row of a frame and for each row following a full black row.

* * * * *